(12) United States Patent
Döppling et al.

(10) Patent No.: US 7,997,396 B2
(45) Date of Patent: Aug. 16, 2011

(54) OVERRUNNING CLUTCH CLAMPING BODY

(75) Inventors: Horst Döppling, Herzogenaurach (DE); Swen Dörrie, Herzogenaurach (DE); Tomas Smetana, Erlangen (DE)

(73) Assignee: Schaeffler KG, Herzogenaurach (DE)

( * ) Notice: Subject to any disclaimer, the term of this patent is extended or adjusted under 35 U.S.C. 154(b) by 401 days.

(21) Appl. No.: 12/157,378

(22) Filed: Jun. 10, 2008

(65) Prior Publication Data
US 2008/0277238 A1    Nov. 13, 2008

(30) Foreign Application Priority Data

May 11, 2007    (DE) .......................... 10 2007 022 148

(51) Int. Cl.
*F16D 41/069*    (2006.01)
(52) U.S. Cl. ...................................... 192/41 A; 192/45.1
(58) Field of Classification Search ................. 192/41 A
See application file for complete search history.

(56) References Cited

U.S. PATENT DOCUMENTS

| | | | | |
|---|---|---|---|---|
| 4,819,775 A * | 4/1989 | Witt et al. | .................. | 192/41 A |
| 5,518,094 A * | 5/1996 | Myrick | ........................ | 192/45.1 |
| 2007/0175722 A1 * | 8/2007 | Straub | ......................... | 192/45.1 |
| 2008/0078640 A1 * | 4/2008 | Smetana | ..................... | 192/41 A |

FOREIGN PATENT DOCUMENTS
WO    WO 2006076950 A1 *    7/2006
* cited by examiner

*Primary Examiner* — Richard M. Lorence
(74) *Attorney, Agent, or Firm* — Charles A. Muserlian (57) ABSTRACT

An overrunning clutch clamping body for an overrunning clutch comprises a first contact surface and a second contact surface for contacting respective clamping raceways. The curvature of the contact surfaces deviates from zero in each direction. Each of the contact surfaces is configured symmetrically both to a first plane (E1) extending normal to the axis of rotation of the overrunning clutch and to a second plane (E2) that is perpendicular to the first plane (E1), and the shape of the first contact surface corresponds to the shape of the second contact surface.

7 Claims, 9 Drawing Sheets

Clamping body circular in shape with e = 0

Clamping body circular in shape with e > 0 (truncated)

Symmetrical cylindrical clamping body with e = 0

Symmetrical cylindrical clamping body with e = 0

Cylindrical clamping body (no symmetry)

Fig. 8a
PRIOR ART

Clamping direction

OVERRUNNING CLUTCH CLAMPING BODY

FIELD OF THE INVENTION

The invention concerns a clamping body for a clamping body overrunning clutch.

BACKGROUND OF THE INVENTION

An overrunning dutch clamping body is known, for example, from DE 10 2005 002 252 A1. This clamping body comprises an inner clamping curve for contacting an inner race ring and an outer clamping curve for contacting an outer race ring, said clamping curves forming a fractional section of a logarithmic spiral.

A clamping body overrunning clutch must be fundamentally distinguished from a clamping roller overrunning clutch. In contrast to a clamping roller overrunning clutch that operates with clamping elements in the form of rollers, the clamping body overrunning dutch comprises clamping elements in the form of clamping bodies that are not rotatable but are arranged only for restricted tilting between the inner ring and the outer ring of the overrunning dutch. Compared to a clamping roller overrunning clutch, a clamping body overrunning clutch can be more compactly filled with clamping elements, so that a higher torque can be transmitted in the same design space.

OBJECTS OF THE INVENTION

It is an object of the invention to provide an overrunning dutch clamping body that can be manufactured particularly efficiently and is easy to assemble.

This and other objects and advantages of the invention will become obvious from the following detailed description.

SUMMARY OF THE INVENTION

The invention achieves the above objects with an overrunning clutch clamping body having the features of claim 1. This clamping body, that is particularly suitable for use in an overrunning dutch of DE 10 2006 038 201.3, comprises two contact surfaces that are intended for contacting respective clamping raceways and have a curvature deviating from zero in each direction. Each contact surface of the clamping body is configured symmetrically both to a first plane extending normal to the axis of rotation of the overrunning dutch and to a second plane that intersects the first plane at right angles. A third plane that is perpendicular to said first and second planes forms a further plane of symmetry, the second contact surface being defined by a mirroring of the first contact surface at this plane of symmetry. This triple symmetry of the clamping body enables a simple manufacturing and assembly of individual clamping bodies and thus of an overrunning dutch equipped with such clamping bodies. A particular advantage is also the suitability of the clamping body for switchable overrunning clutches, particularly for such that clamp on both sides.

In a preferred embodiment, a line of intersection between a contact surface of the clamping body and the first plane that is normal to the axis of rotation partially describes a logarithmic spiral in parts. With regard to a clamping body profile that describes a part of a logarithmic spiral, reference is made to paragraph 11 of DE 10 2005 002 252 A1. In the present case, however, due to the multiple symmetry, the two clamping curves, i.e. the lines of intersection between the first plane and the inner and outer contact surface cannot be situated on one and the same logarithmic spiral. Similarly, it is just as impossible for the clamping curve on one of the contact surfaces to be described completely on a single logarithmic spiral. Much rather, the clamping curve both of the outer and the inner contact surface comprises two sections that lie on mirror-symmetrical logarithmic spirals. The center points of these spirals can lie either on the second plane that is parallel to the axis of rotation of the overrunning dutch or can be spaced from this plane. The center point of a spiral describing a section of the clamping curve lies on the side of the second plane opposite to this section. This enables a slimmer design shape of the clamping body. Preferably, the distance between the center point of the logarithmic spiral and the second plane, also called radial offset, is at least 2.5%, particularly at least 5%, and at most 10%, particularly at most 7.5%, of the height of the clamping body. By height of the clamping body is to be understood its extent along the line of intersection between the first and the second plane.

The line of intersection between the contact surface of the clamping body and the second plane that is parallel to the axis of rotation of the overrunning dutch is preferably, at least partially, configured as a circular arc. The overrunning clutch clamping body is therefore particularly suitable for a clamping ball bearing as disclosed in DE 10 2006 038 201.3. The clamping body preferably comprises flattened portions adjacent to the contact surfaces and parallel to the first plane, as well as flattened portions likewise connecting the contact surfaces to each other and parallel to the second plane, so that on the whole, with the exception of the multi-axially curved contact surfaces, the clamping body has a substantially cuboid shape.

The object of the invention is also achieved with an overrunning clutch clamping body having the features of claim 10. Unlike the clamping body of claim 1, this overrunning dutch clamping body is intended for use in an overrunning dutch having cylindrical clamping raceways. The contact surfaces of the overrunning clutch clamping body of claim 10 are curved only about one axis and are connected to each other through lateral surfaces extending normal to the axis of rotation of the overrunning clutch and through two front surfaces perpendicular to these lateral surfaces. Similar to the clamping body of claim 1, the two contact surfaces of the overrunning clutch clamping body of claim 10 are also identically configured and each contact surface is symmetric about a plane parallel to the front surfaces. The advantages of the clamping body of claim 1 with regard to manufacture and assembly apply equally to the clamping body of claim 10.

Several examples of embodiment of the invention will now be described more closely with reference to the appended drawing.

BRIEF DESCRIPTION OF THE DRAWINGS

FIGS. 2*a*, 2*b*, 2*c* to 7*a*, 7*b*, 7*c* show different overrunning dutch clamping bodies of the invention in perspective views.

DETAILED DESCRIPTION OF THE DRAWING

Figure 1A:
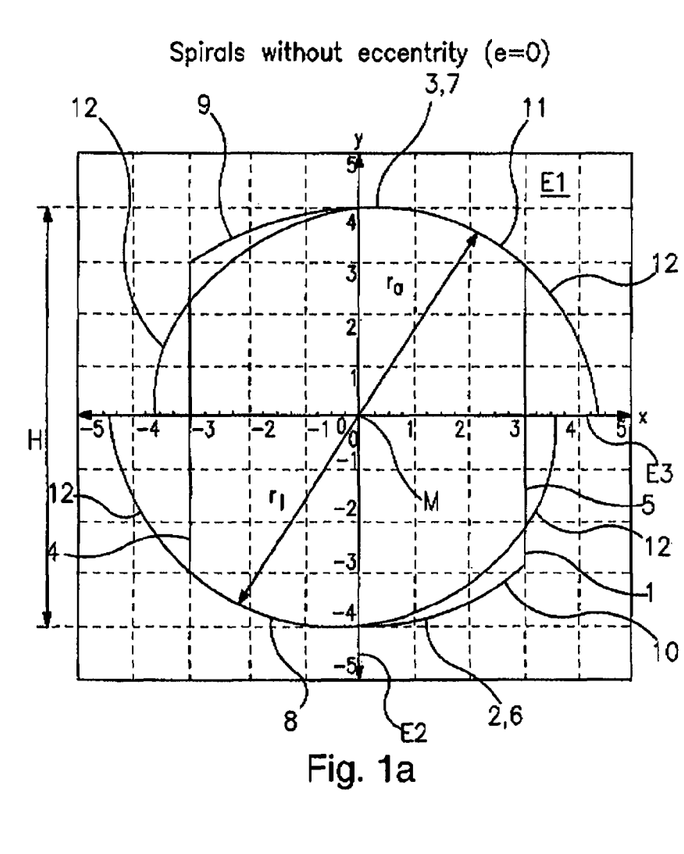
FIGS. 1*a*, 1*b* show cross-sections of an overrunning dutch clamping body.
Figure 1B:
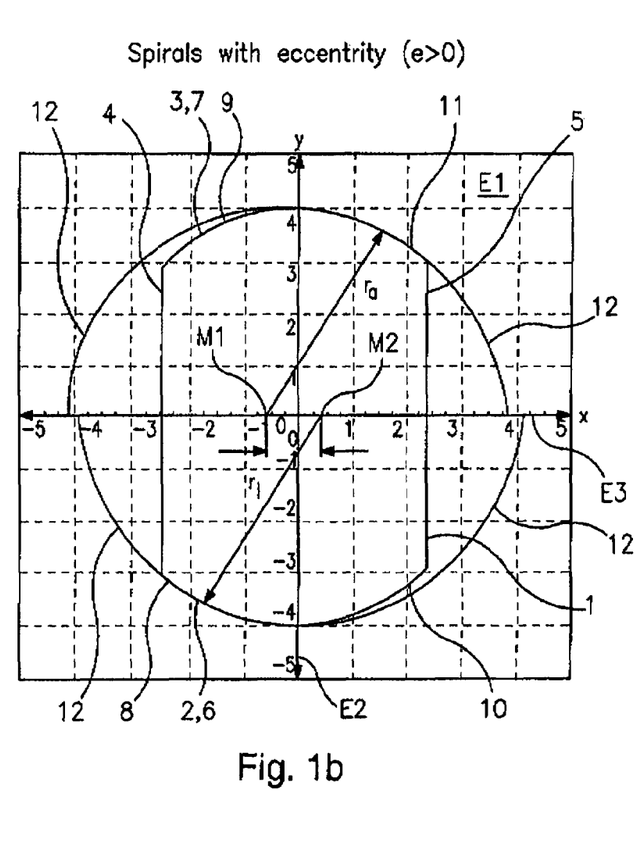
Figure 2A:
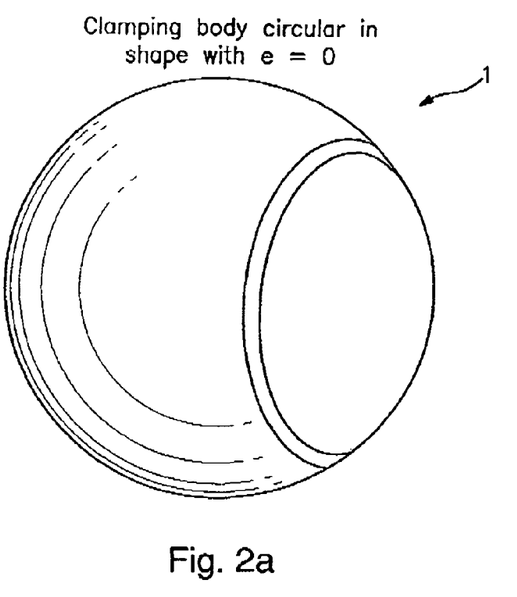
Figures 2B, 2C:
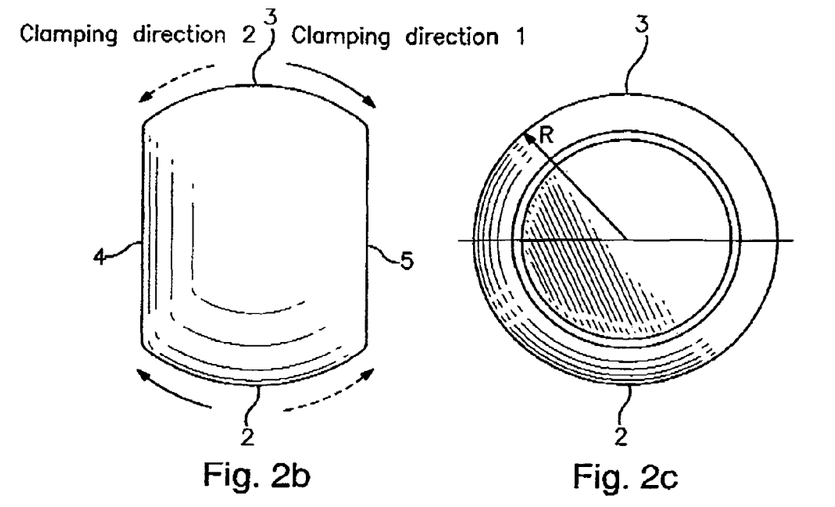
Figure 3A:
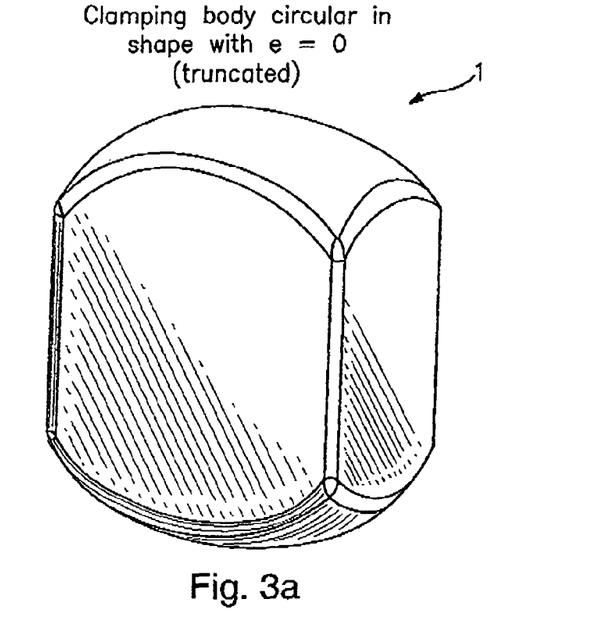
Figure 3B:
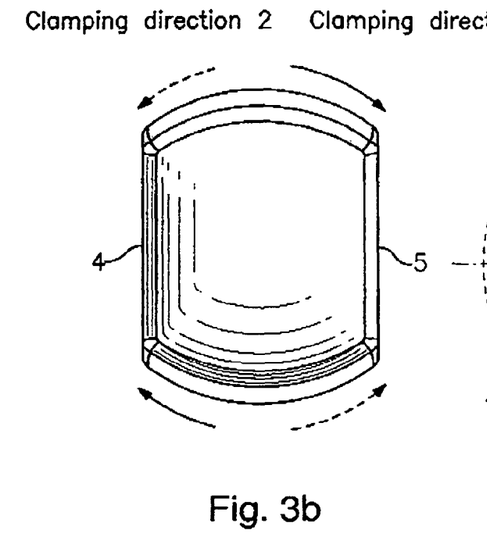
Figure 3C:
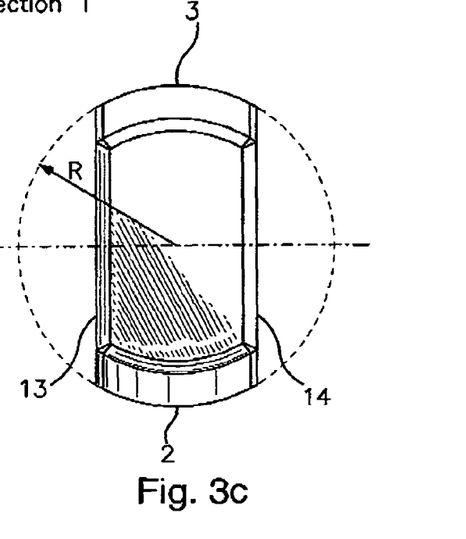

The plane of projection shown in FIGS. 1*a* and 1*b* extends normal to the axis of rotation of a clamping body overrunning dutch, not illustrated, and is designated as a first plane E1. The plane E1 extends centrally through an overrunning clutch clamping body 1 that has a mirror-symmetrical configuration about this plane, also called normal plane E1. When the overrunning dutch rotates with blocked clamping bodies 1, these clamping bodies are displaced in tangential direction, corresponding substantially to the x-direction as shown in FIGS. 1a and 1b. Depending on the angle of tilt of the clamping body, the y-axis shown in FIGS. 1a and 1b extends approximately in radial direction of the overrunning clutch, also called vertical direction without loss of generality. The extent of the overrunning clutch clamping body 1 measured in the y-direction is designated as its height H. The y-axis lies in a second plane E2 that is perpendicular to the first plane E1 and parallel to the axis of rotation of the overrunning clutch. The x-axis lies in a third plane E3 that is perpendicular both to the first plane E1 and to the second plane E2. The clamping body 1 has a mirror-symmetrical configuration with respect to each of the planes E1, E2 and E3.

The second plane E2, also called radial plane, intersects an inner contact surface 2 as well as an outer contact surface 3 of the clamping body 1, these contact surfaces 2, 3 being situated respectively on an inner clamping raceway and an outer clamping raceway of the overrunning clutch. The contact surfaces 2, 3 of the clamping body 1 are adjacent to front surfaces 4, 5 whose surface normal is parallel to the x-axis and thus substantially defines the tangential direction of the overrunning clutch.

The lines of intersection between the first plane E1 and the contact surfaces 2, 3 visible in FIGS. 1a and 1b are also called clamping curves 6, 7. Each of the inner clamping curve 6 and the outer clamping curve 7 comprises a first section 8, 9 and a second section 10, 11 resulting from a mirroring at the plane E2. Each section 8, 9, 10, 11 forms a section of a separate logarithmic spiral 12. In the example of embodiment of FIG. 1a, these spirals have a common center point M that is identical to the zero point of the illustrated right-angled system of coordinates. By way of example are shown, an inner radius of curvature $r_i$ and an outer radius of curvature $r_a$, which radii increase with increasing distance from the second plane E2. The inner section 8 of the clamping curve 6 adjoining the first front surface 4 results from a point-mirroring of the outer section 11 of the clamping curve 7 adjoining the second front surface 5. Correspondingly, this also applies to the section 10 of the inner clamping curve 6 adjoining the second front surface 5 and to the section 9 of the outer clamping curve 7 adjoining the first front surface 4.

In the example of embodiment of FIG. 1b, the logarithmic spirals 12 described by the different sections 8, 9, on the one side, and by the sections 10, 11, on the other side, have spaced apart center points M1, M2, the distance between the center points M1 and M2 being designated as eccentricity e. The eccentricity e, that means, twice the distance of a center point M1, M2 from the second plane E2 amounts to about one eighth of the height H of the clamping body 1.

Figure 4A:
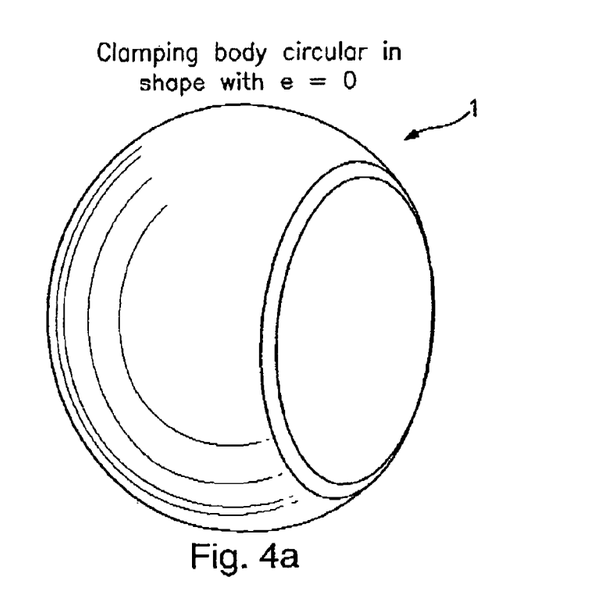
Figure 4B:
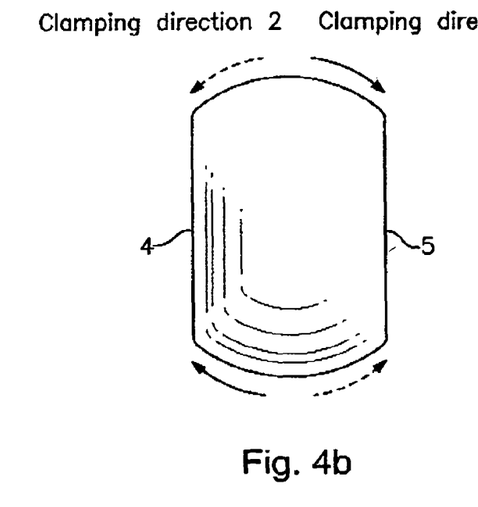
Figure 4C:
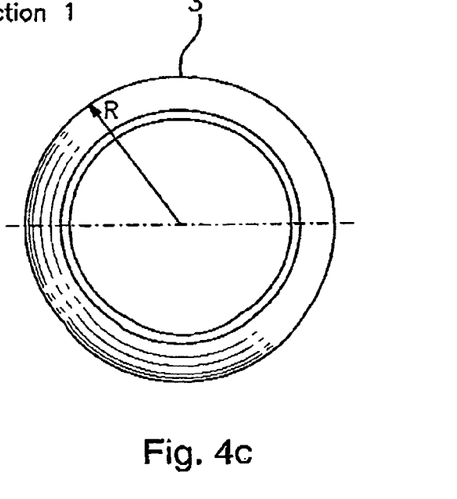
Figure 5A:
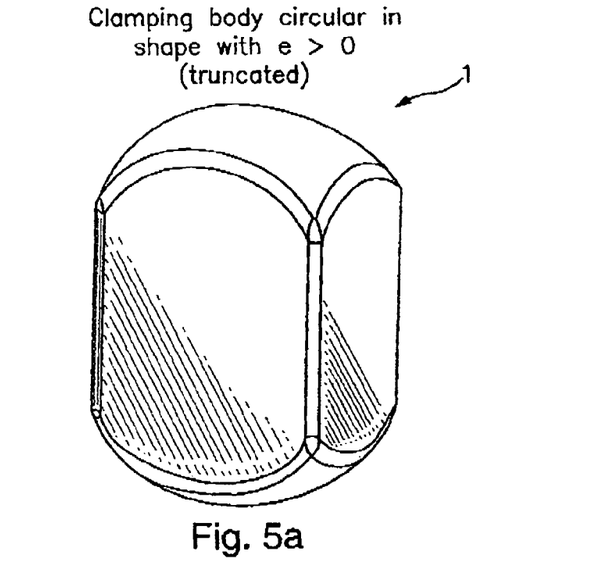
Figure 5B:
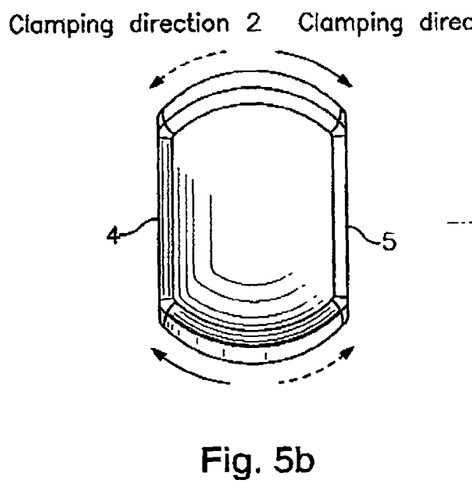
Figure 5C:
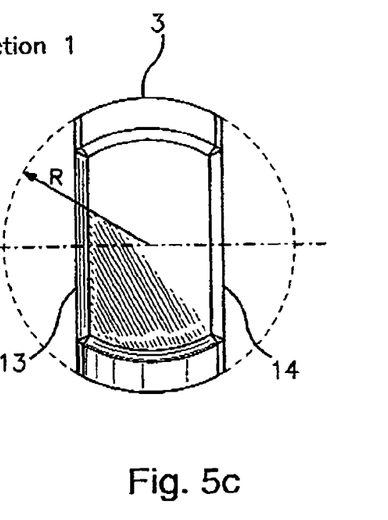
Figure 6A:
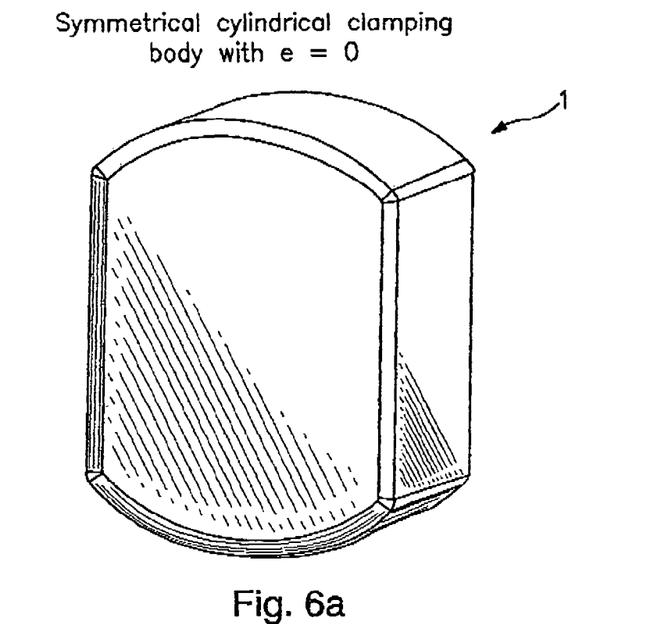
Figures 6B, 6C:
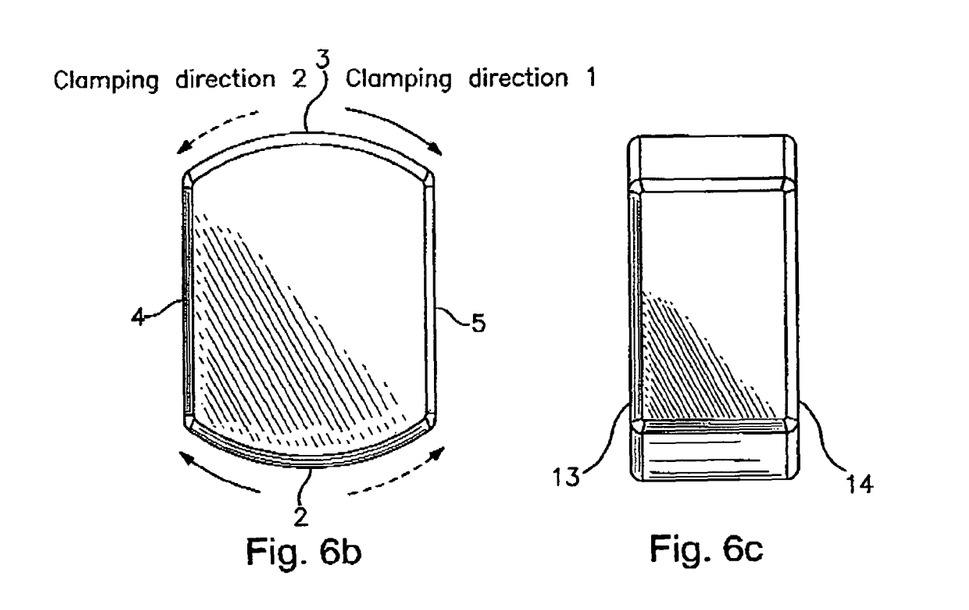
Figure 7A:
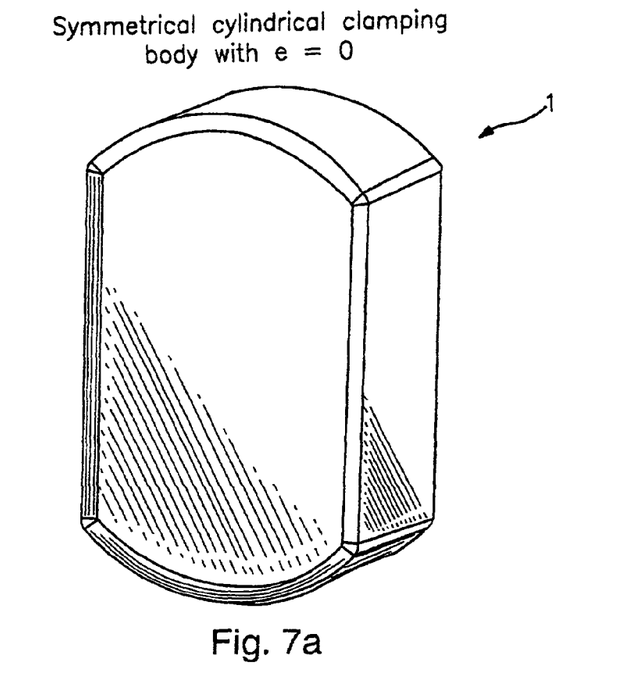
Figures 7B, 7C:
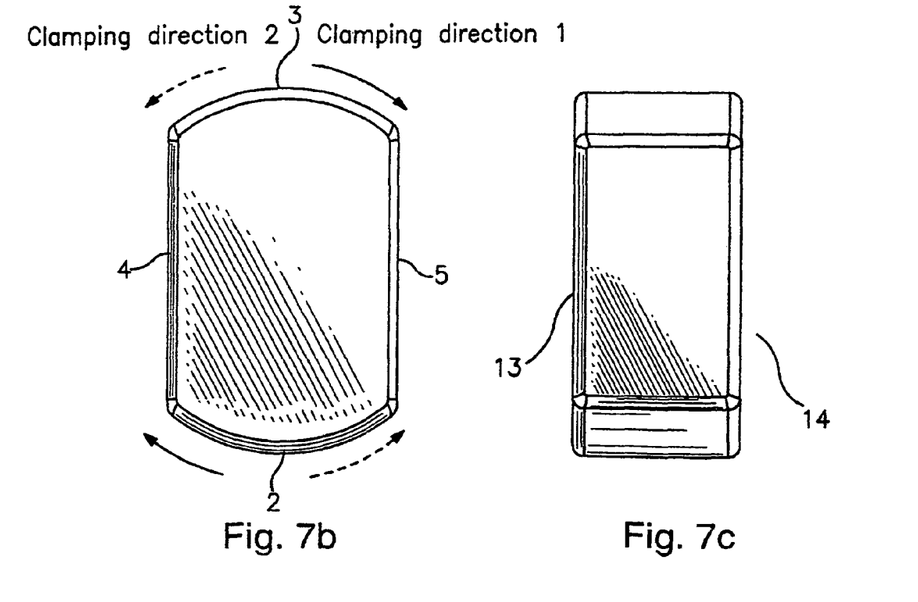

The profile of the clamping body of the examples of embodiment shown in FIGS. 2a to 2c and 3a to 3c corresponds to the profile illustrated in FIG. 1a. FIGS. 4a to 4c and 5a to 5c, in contrast, show examples of embodiment having a profile in keeping with a clamping body profile according to FIG. 1b. A common feature between the example of embodiment of FIG. 2a to 2c and that of FIG. 4a to 4c is the circular surface of intersection between the radial plane E2 and the clamping body 1. Accordingly, the front surfaces 4, 5 of these embodiments are also circular in shape. The clamping bodies 1 of FIGS. 3a to 3c and 5a to 5c, in contrast, comprise flat lateral surfaces 13, 14 that extend at right angles to the front surfaces 4, 5 and parallel to the first plane E1, that is to say, normal to the axis of rotation of the overrunning clutch.

Figure 8A:
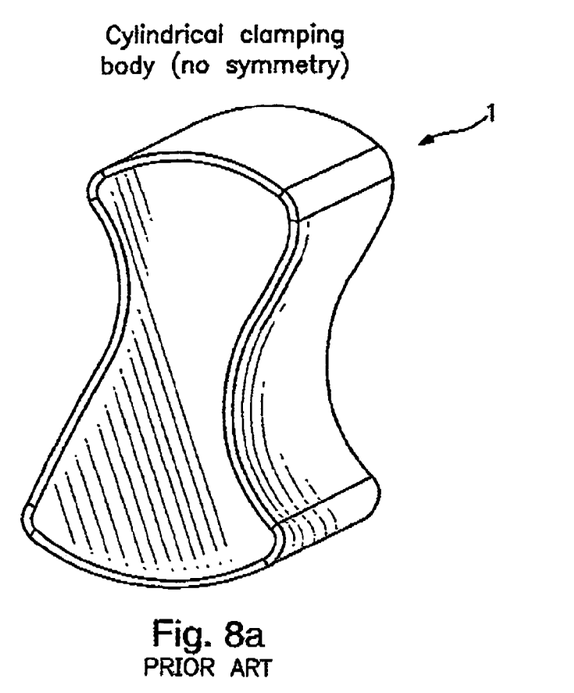
FIGS. 8*a*, 8*b*, 8*c* show a prior art overrunning clutch clamping body.
Figure 8B:
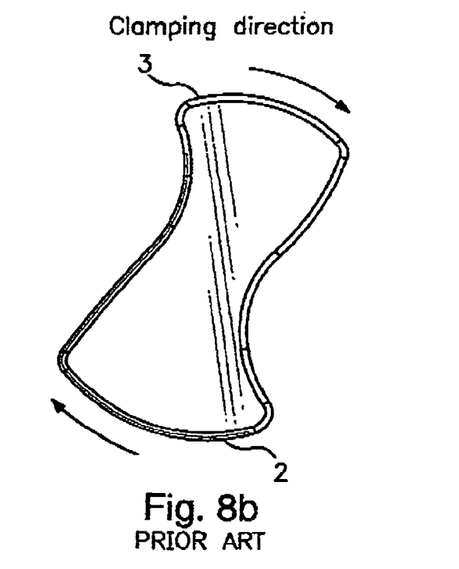
Figure 8C:
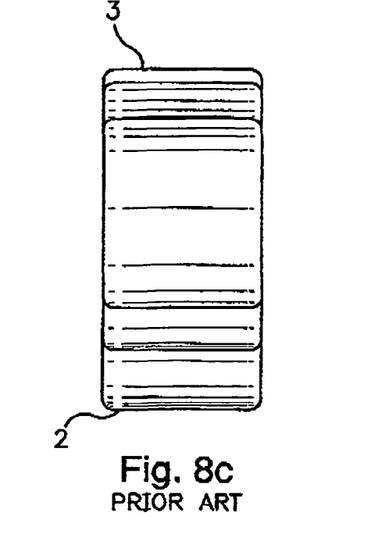
Figure 9:
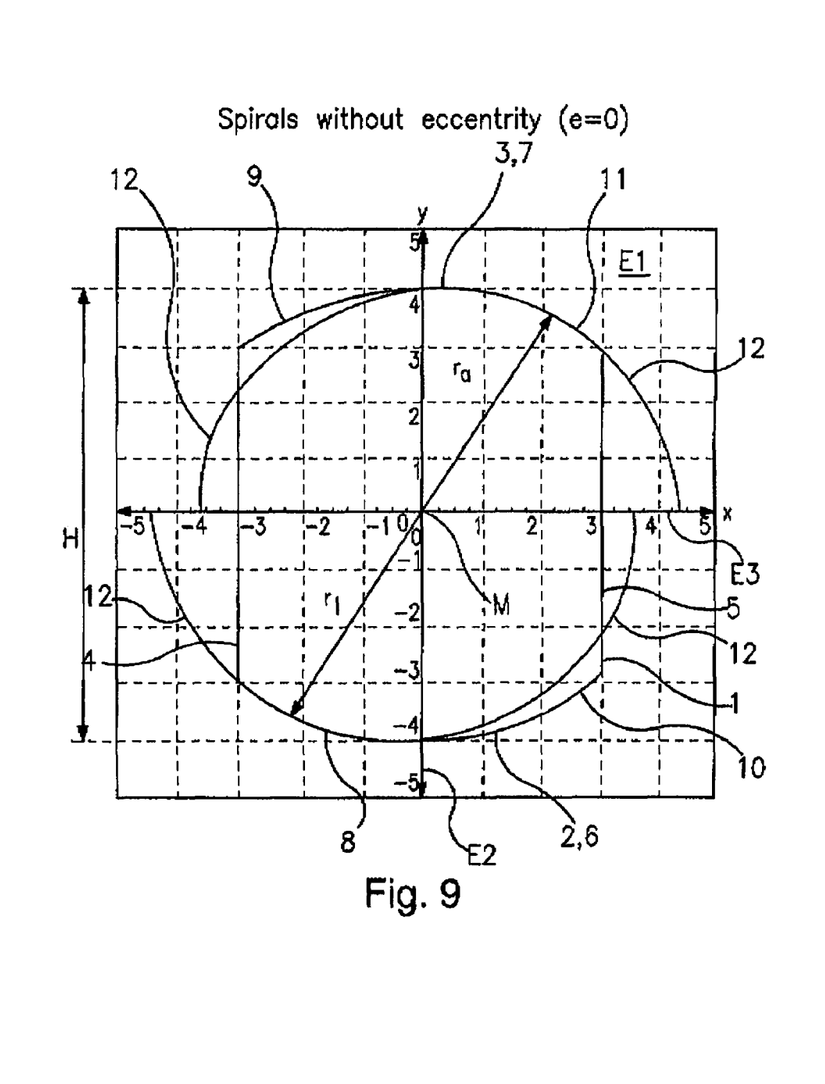
FIG. 9 is a graph showing a cross-section of an overrunning clutch clamping body of the prior art of FIGS. 8*a*, 8*b* and 8*c*.

Similar to the clamping bodies 1 of FIGS. 3a to 3c and 5a to 5c, the clamping bodies 1 of FIGS. 6a to 6c and 7a to 7c comprise parallel front surfaces 4, 5 and lateral surfaces 13, 14 perpendicular to these lateral surfaces 13, 14. Thus, the clamping body 1 of the embodiments of FIGS. 6a to 6c and 7a to 7c also has a cuboid basic shape. The clamping curves 6, 7 of the example of embodiment of FIGS. 6a to 6c correspond to the profile shown in FIG. 1a, while the clamping curves 6, 7 of the example of embodiment of FIGS. 7a to 7c correspond to the profile shown in FIG. 1b. The contact surfaces 2, 3 of the clamping body 1 of FIGS. 6a to 6c and 7a to 7c are only curved about one axis which means that they can be laid out into a flat surface. The clamping bodies 1 of FIGS. 6a to 6c and 7a to 7c are thus suitable for use in an overrunning dutch with cylindrical clamping raceways. In contrast, the clamping bodies 1 of the examples of embodiment shown in FIGS. 2a to 5c are particularly suitable for use in an overrunning dutch with groove-like clamping raceways as disclosed, in principle, in DE 10 2006 038 201.3. By way of comparison, FIGS. 8a to 8c show a prior art clamping body 1.

REFERENCE NUMERALS

1 Overrunning clutch clamping body
2 Contact surface
3 Contact surface
4 Front surface
5 Front surface
6 Clamping curve
7 Clamping curve
8 Section
9 Section
10 Section
11 Section
12 Spiral
13 Lateral surface
14 Lateral surface
E1 First plane
E2 Second plane
E3 Third plane
H Height
M Center point
M1 Center point
M2 Center point
e Eccentricity
$r_i$ Radius of curvature
$r_a$ Radius of curvature

The invention claimed is:

1. An overrunning clutch clamping body for use in an overrunning clutch comprising a first contact surface and a second contact surface for contacting respective clamping raceways, each of these contact surfaces comprising a curvature deviating from zero in each direction, wherein each of the first and second contact surfaces is configured symmetrically both to a first plane (E1) extending normal to an axis of rotation of the overrunning clutch and to a second plane (E2) that is perpendicular to the first plane (E1), and a shape of the first contact surface corresponds to a shape of the second contact surface wherein a line of intersection between the contact surface and the first plane (E1) describes a logarithmic spiral and each of different sections of the line of intersection situated on a side of the second plane (E2) describes a logarithmic spiral whose center point (M1, M2) is situated at a distance from the second plane (E2).

2. An overrunning clutch clamping body of claim 1, wherein a center point (M) of the spiral described by the line of intersection is situated in the second plane (E2).

3. An overrunning clutch clamping body of claim 1, wherein a distance of the center point (M1, M2) of the logarithmic spiral from the second plane is at least 2.5% of a height (H) of the clamping body measured parallel to the second plane (E2).

4. An overrunning clutch clamping body of claim 1, wherein a distance of the center point (M1, M2) of the logarithmic spiral from the second plane is at least 10% of a height (H) of the clamping body measured parallel to the second plane (E2).

5. An overrunning clutch clamping body of claim 1, wherein the line of intersection between the contact surface and the second plane (E2) is circular at least in parts.

6. An overrunning clutch clamping body of claim 1, wherein the clamping body has flattened portions arranged parallel to the first plane (E1).

7. An overrunning clutch clamping body of claim 1, wherein the damning body has flattened portions arranged parallel to the second plane (E2).

* * * * *